(12) United States Patent
McCarthy et al.

(10) Patent No.: US 6,282,312 B1
(45) Date of Patent: *Aug. 28, 2001

(54) SYSTEM USING ONE OR MORE RESIDUAL IMAGE(S) TO REPRESENT AN EXTENDED COLOR GAMUT DIGITAL IMAGE

(75) Inventors: Ann L. McCarthy, Pittsford; Kevin E. Spaulding, Spencerport; Edward J. Giorgianni, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/162,201

(22) Filed: Sep. 28, 1998

(51) Int. Cl.[7] .................................................. G06K 9/00
(52) U.S. Cl. ........................................... 382/162; 358/523
(58) Field of Search .................................... 382/162–167, 382/240; 358/1.9, 518, 520, 523, 504, 517; 348/431.1, 434.1; 345/153, 155

(56) References Cited

U.S. PATENT DOCUMENTS

| | | |
|---|---|---|
| 4,417,270 | 11/1983 | Nagao et al. . |
| 4,903,317 | 2/1990 | Nishihara et al. . |
| 5,050,230 | 9/1991 | Jones et al. . |

(List continued on next page.)

FOREIGN PATENT DOCUMENTS

| | | |
|---|---|---|
| 09-312777 | 12/1997 | (JP) . |
| 11-331622 | 11/1999 | (JP) . |
| WO 99/41734 | 8/1999 | (WO) . |

OTHER PUBLICATIONS

Lindley, Craig A., "JPEG–like Image Compression, part 1: Here's a C++ Class Library for JPEG–like Image Compression", Dr. Dobbs Journal, v. 20, n. 7, pp. 50–59, Jul. 1995.
English Language Translation of Claim 1 of Japanese Printed Patent Application No. 9–312777 (Kojima Misaki et al.), of Dec. 2, 1997, as translated by the Japanese Patent Office, p. 1.

(List continued on next page.)

Primary Examiner—Joseph Mancuso
Assistant Examiner—Ali Bayat
(74) Attorney, Agent, or Firm—Raymond L. Owens

(57) ABSTRACT

A digital image processing system includes one or more opto-electronic image digitization device(s) which digitize still photographic images and produce an extended color gamut digital image corresponding to each still photographic image, and an image processing unit, coupled with said image digitization device(s), which is operative to receive a plurality of extended color gamut digital images from the image digitization device(s). The image processing unit produces at least one limited color gamut digital image from each said extended color gamut digital image by adjusting the color values of the extended color gamut digital image to fit within a limited color gamut; represents each said limited color gamut digital image in a storage color space; determines one or more residual image(s) each representing a difference between one said extended color gamut digital image and its corresponding limited color gamut digital image; and associates each limited color gamut digital image in the storage color space with its residual image(s) such that the associated residual images and the limited color gamut digital images in the storage color space are adapted to be used to reconstruct extended color gamut digital images.

49 Claims, 5 Drawing Sheets

U.S. PATENT DOCUMENTS

| | | |
|---|---|---|
| 5,122,873 | 6/1992 | Golin . |
| 5,268,754 * | 12/1993 | Van De Capelle et al. ......... 382/527 |
| 5,297,219 | 3/1994 | Weldy . |
| 5,317,425 * | 5/1994 | Spence et al. ....................... 358/504 |
| 5,333,069 * | 7/1994 | Spence ................................. 358/517 |
| 5,510,910 * | 4/1996 | Bockman et al. ................... 358/502 |
| 5,528,377 | 6/1996 | Hutcheson . |
| 5,539,540 | 7/1996 | Spaulding et al. . |
| 5,583,655 | 12/1996 | Gregory, Jr. et al. . |
| 5,583,666 | 12/1996 | Ellson et al. . |
| 5,666,215 | 9/1997 | Fredlund et al. . |
| 5,713,062 * | 1/1998 | Goodman et al. ..................... 399/49 |
| 5,760,386 * | 6/1998 | Ward .................................... 235/493 |
| 5,892,891 | 4/1999 | Dalal et al. . |
| 5,949,967 * | 9/1999 | Spaulding et al. .................... 358/1.9 |
| 5,990,931 * | 11/1999 | Nimri et al. ............................ 348/15 |
| 6,043,909 | 3/2000 | Holub . |

OTHER PUBLICATIONS

Abrash, Michael, "Zen of Graphics Programming with Disk", IDG Books Worldwide, as printed from Dr Dobbs (TM) Graphics Books on CD–ROM, "Notes Before We Begin", reprinted as p. 1.

Stroebel, Leslie et al., ed., "Encyclopedia of Photography", Boston: Focal Press, ISBN 0–240–80059–1, p. 113.

R. S. Gentile, E. Walowit, and J. P. Allebach, "A comparison of techniques for color gamut mismatch compensation," J. Imaging Technol. 16, 176–181 (1990).

English Language Translation selected passages of Japanese Printed Patent Application No. 11–331622 (Okubo Akihito) of Nov. 30, 1999, as translated by the Japanese Patent Office, pp. 1–9.

U.S. application No. 09/162,051, McCarthy et al., filed Sep. 28, 1998.

U.S. application No. 09/162,234, Spaulding et al., filed Sep. 28, 1998.

U.S. application No. 09/162,201, McCarthy et al., filed Sep. 28, 1998.

U.S. application No. 09/162,205, McCarthy et al., filed Sep. 28, 1998.

U.S. application No. 09/489,367, Spaulding et al., filed Jan. 21, 2000.

U.S. application No. 09/354,808, Parada et al., filed Jul. 16, 1999.

U.S. application No. 09/543,652, Spaulding et al., filed Apr. 5, 2000.

U.S. application No. 09/543,038, Spaulding et al., filed Apr. 5, 2000.

U.S. application No. 09/651,510, Spaulding et al., filed Aug. 30, 2000.

U.S. application No. 09/716,107, Spaulding et al., filed Nov. 17, 2000.

IEC TC100 sRGB Draft Standard.

* cited by examiner

SYSTEM USING ONE OR MORE RESIDUAL IMAGE(S) TO REPRESENT AN EXTENDED COLOR GAMUT DIGITAL IMAGE

CROSS REFERENCE TO RELATED APPLICATIONS

Reference is made to commonly assigned U.S. patent application Ser. No. 09/162,051, filed Sep. 28, 1998, entitled "Representing an Extended Color Gamut Digital Image in a Limited Color Gamut Color Space" to McCarthy et al; U.S. patent application Ser. No. 09/162,026, filed Sep. 28, 1998, entitled "Using a Residual Image to Represent an Extended Color Gamut Digital Image" to McCarthy et al; U.S. patent application Ser. No. 09/162,234, filed Sep. 28, 1998, entitled "Method of Applying Manipulations to an Extended Color Gamut Digital Image" to Spaulding et al; and U.S. patent application Ser. No. 09/162,205, filed Sep. 28, 1998, herewith, entitled "Using a Set of Residual Images to Represent an Extended Color Gamut Digital Image" to McCarthy et al, the disclosures of which are incorporated herein by reference.

FIELD OF THE INVENTION

The present invention relates to the field of digital imaging, and more particularly to a digital imaging system employing an extended color gamut digital image.

BACKGROUND OF THE INVENTION

A digital imaging system is comprised of one or more digitization units, one or more image processing units, and one or more image display units. The system components may be co-located at a single site, or dispersed over separate geographic locations. In addition to the geographic diversity, system components may perform related image processing operations at various non-contiguous points in time. Thus the transmission of digital image information from one location to another, and from one point in time to another, is central to the operation of a digital imaging system.

In digital imaging systems, there are many ways to represent images in digital form. Not only are there many different formats of digital files, used to encapsulate the image information, but there is also a large variety of different color spaces and color encodings that can be used to specify the color of digital images within the digital files. The fundamental objective of these image representations is to communicate the necessary image information from the "earlier" image processing operations to the "later" image processing operations.

In some cases, the color encoding may be in terms of a so-called device independent color space, such as the well-known CIELAB color space. In recent years this color space has been used extensively to specify the color of digital images in color-managed digital imaging systems. In some cases, the image may actually be stored in the CIELAB color space. More commonly, the color space may be used to connect device profiles, which can be used to describe the color characteristics of various color imaging devices such as scanners, printers, and CRT video displays. The KODAK Photo YCC Color Interchange Space is another example of a device independent color space that can be used to encode digital images.

In other cases, the color encoding may be in terms of a device dependent color space. For example, an image processing operation performed in conjunction with an image digitization operation, may presuppose the intended image display and encode the image in a display-ready representation. Video RGB color spaces and CMYK color spaces are examples of this type of encoding. When a color image is encoded in a display device dependent color space, it will have the desired color appearance when it is displayed on the particular display device associated with that color space. The advantage of a device dependent color space is that the image is ready to be displayed or printed on the target device. However, the disadvantage is that the image will necessarily be limited to the color gamut of the particular target device. The color gamut of an imaging device refers to the range of colors and luminance values that can be produced by the device. Therefore, if the target device has a limited dynamic range, or is incapable of reproducing certain saturated colors, then it is not possible to encode color values outside of the range of colors that can be produced on the device. This limitation will constrain each of the later image processing and display operations.

One type of device dependent color space that has become quite widespread for use as a storage and manipulation color space for digital images is the video RGB color space. In reality, there are many different video RGB color spaces due to the fact that there are many different types of video RGB displays. As a result, a particular set of video RGB color values will correspond to one color on one video display and to another color on another video display. Therefore, video RGB has historically been a somewhat ambiguous color representation due to the fact that the color values could not be properly interpreted unless the characteristics of the target video display were known. Nonetheless, video RGB color spaces have become the defacto standard in many applications because the creation, display and editing of images on video displays are central steps in many digital imaging systems.

Recently, there have been efforts to standardize a particular video RGB color space in order to remove the ambiguity in the interpretation of the color values. (See the proposed IEC TC100 sRGB Draft Standard). One such proposed standard color space is known as "sRGB." This color space specifies a particular set of red, green, and blue primaries, a particular whitepoint, and a particular non-linear code value to light intensity relationship. Together, these tightly define the overall relationship between the digital code values and the corresponding device independent color values.

Although the use of a standard video RGB color space eliminates much of the ambiguity usually associated with video RGB color spaces, it does nothing to address the fact that encoding with this color space constrains the digital imaging system since video RGB has a limited color gamut relative to desirable later image processing operations and relative to other display devices. This constraint arises because any display device will have a limited color gamut relative to that of an original scene. For example, a scene may have a luminance dynamic range of 1000:1 or more, whereas a typical video display or reflection print will have a dynamic range on the order of 100:1. Certain image capture media, such as photographic negative film, can actually record dynamic ranges as large as 8000:1. Even though this is larger than the luminance dynamic range associated with most scenes, the extra dynamic range is often useful to provide additional information to certain image processing operations as an allowance for exposure errors, light source variations, etc.

In order to encode images from various sources in a video RGB representation, it is necessary to discard information that is outside the color gamut of the video RGB color space. In some cases, such as when it is desired to encode the appearance of colors in an original scene or the colors captured by a photographic negative, a great deal of information will typically need to be discarded due to the large disparity in the dynamic ranges. For the case where it is desired to scan a reflection print and store it in a video RGB color space, it is still necessary to discard a substantial amount of information due to the mismatch in the color gamuts, even though the luminance dynamic ranges may be quite similar.

For example, FIG. 1 shows a comparison of a typical Video RGB Color Gamut 10 and a typical Reflection Print Color Gamut 12. In this case, a*-b* cross-sections of the color gamuts are shown in the CIELAB space at an L* value of 65. The colors that are inside the boundary are within the gamuts of the respective devices, while those that are outside the boundary cannot be reproduced, and are therefore referred to as "out-of-gamut" colors. It can be seen that there is a large set of color values with a b* value larger than 60 that can be produced on the printer, but are outside the color gamut of the video display. As a result, if the reflection print were scanned and stored in a video RGB color space, it would not be possible to encode this color information.

The mismatch between the video RGB color gamut and the color gamuts of other display devices and image sources represents a serious limitation on the usefulness of the video RGB color space in communicating digital image information throughout a digital imaging system. However, in many cases, the convenience of storing and transmitting the image in a color space that is ready for direct display on a computer video CRT has been the over-riding factor in the determination of the preferred color space. This has come at the expense of image processing and display operations that can utilize the extended color gamut information that may have existed in an input image.

SUMMARY OF THE INVENTION

It is an object of the present invention to overcome the limitations of the prior art by providing an imaging system for the creation, storage, and use of images in a color space having a limited color gamut, while retaining the extended color gamut information for use by applications and display devices that can make beneficial use of this information.

This object is achieved in a digital image processing system comprising:

a) one or more opto-electronic image digitization device (s) which digitize still photographic images and produce an extended color gamut digital image corresponding to each still photographic image; and b) an image processing unit, coupled with said image digitization device(s), which is operative to receive a plurality of extended color gamut digital images from said image digitization device(s) and including means for:

i) producing at least one limited color gamut digital image from each said extended color gamut digital image by adjusting the color values of the extended color gamut digital image to fit within a limited color gamut;

ii) representing each said limited color gamut digital image in a storage color space;

iii) determining one or more residual image(s) each representing a difference between one said extended color gamut digital image and its corresponding limited color gamut digital image; and iv) associating each limited color gamut digital image in the storage color space with its residual image(s) such that the associated residual images and the limited color gamut digital images in the storage color space are adapted to be used to reconstruct extended color gamut digital images.

ADVANTAGES

The present invention has the advantage that digital imaging systems comprised of an image digitization unit, in conjunction with an image processing unit, can store digital images in a color space convenient for a particular application while overcoming the color gamut limitation associated with hat color space. For example, the image can be stored in a video RGB color space that is well adapted for fast and convenient display on a computer system without compromising the potential quality of the image for other uses.

It has the additional advantage that the use of the extended color gamut information is optional for later image processing and display operations. As a result, the benefits of the extended color gamut information can be gained by digital imaging system components and applications that are able to make use of it, without introducing an image quality or computation penalty for components or applications that do not require the optional information or that are not able to make use of it.

DETAILED DESCRIPTION OF THE INVENTION

Before describing in detail the present invention, it should be observed that the present invention resides primarily in a digital image color gamut representation and its use, and is not limited to any particular imaging system component configuration. Accordingly, the system components shown in the illustrative block diagrams are representative of convenient functional categories of system components that may be involved in the creation and use of the limited color gamut digital images and their associated residual images.

Figure 2:
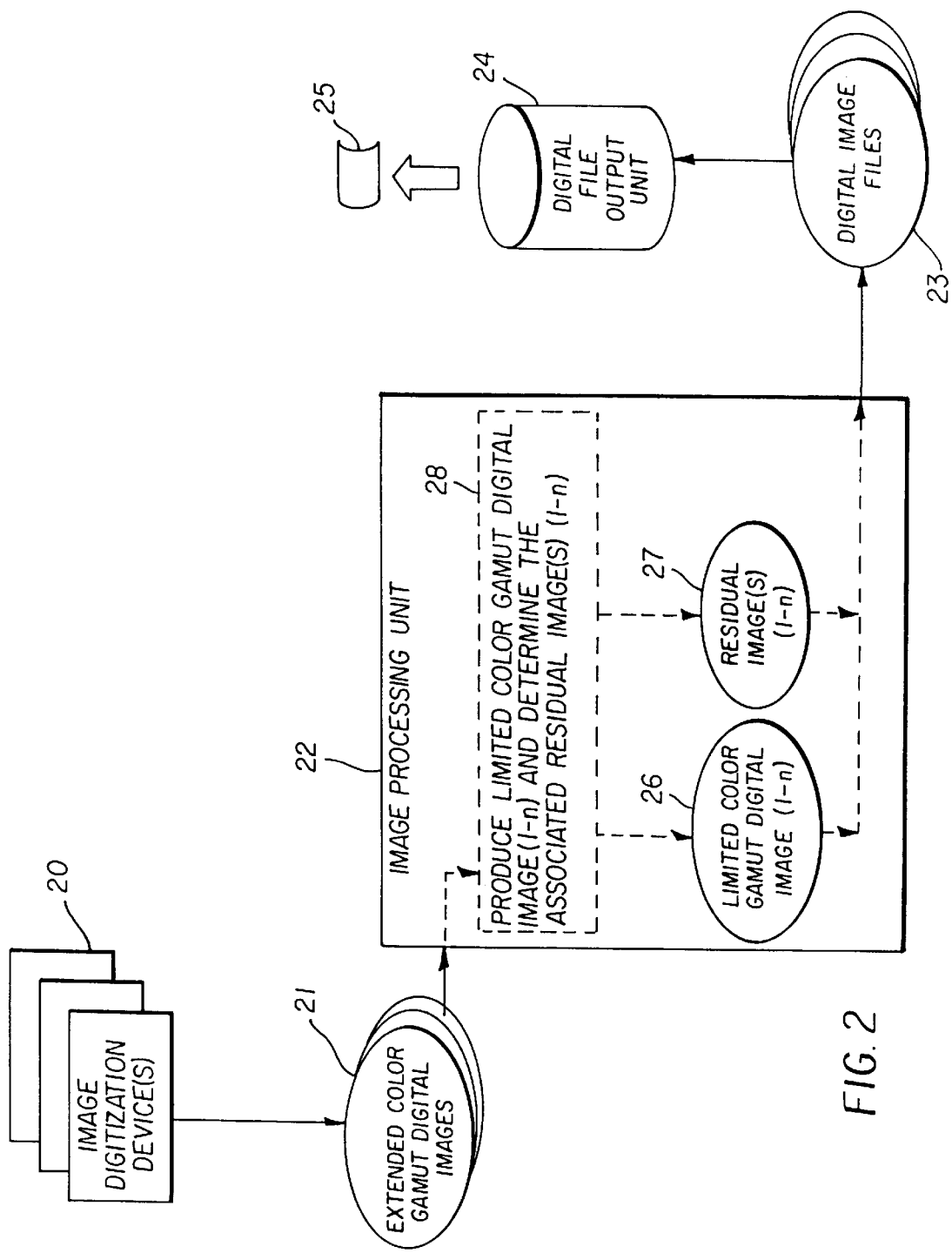
FIG. 2 is an imaging system diagram showing one possible configuration of system components involved in the process of making limited color gamut digital images associated with residual images in accordance with the present invention.

One preferred embodiment of the present invention is shown in FIG. 2. One or more opto-electronic image digitization device(s) 20 digitize still photographic images and produce extended color gamut digital images 21. Each extended color gamut digital image 21 corresponds to one digitized image source.

An image processing unit 22 receives the extended color gamut digital images 21 from the opto-electronic image digitization device(s) 20. Each extended color gamut digital image 21 has color values that are outside the limited color gamut of a storage color space. A produce images task 28 performed by the image processing unit 22 in this embodiment produces (1–n) limited color gamut digital images 26 and determines (1–n) associated residual images 27. The image processing unit 22 operates on each extended color gamut digital image 21 as it is available to produce at least one corresponding limited color gamut digital image 26 by adjusting the color values of the extended color gamut digital images 21 to fit within a limited color gamut. Next, as each limited color gamut digital image 26 is available the image processing unit 22 represents each limited color gamut image 26 in a storage color space. Then the image processing unit 22 determines one or more residual image(s) 27, associated with each limited color gamut digital image 26, and representing the difference between each limited color gamut digital image 26 and its corresponding extended color gamut digital image 21. The limited color gamut digital images 26 in the storage color space and their associated residual images 27 are associated such that they are adapted to be used to reconstruct extended color gamut digital images 21. Further, the image processing unit 22 then operates on each limited color gamut digital image 26 with its associated residual image(s) 27 to create corresponding digital image files 23, stored internally using a digital storage medium. Each digital image file 23 is then delivered to the digital file output unit 24 which stores each digital image file 23 on a transportable digital storage medium 25.

A key aspect of the present invention is the creation of residual images 27 representing the differences between extended color gamut digital images 21 and their corresponding limited color gamut digital images 26. Other prior art systems include the computation of residual images, but none involve computing a difference between an extended color gamut digital image and a limited color gamut digital image. Nishihara et al. (U.S. Pat. No. 4,903,317) describe the computation of a residual image determined from the difference between an original image, and an image that has been compressed using a lossy image data compression technique and subsequently decompressed. The residual image represents the compression artifacts that are introduced during the compression/decompression process. Golin (U.S. Pat. No. 5,122,873) also describes a method for encoding images using a residual image. In this case, the residual image relates to the difference between images of different spatial resolution. It is also known that a residual image can be computed between a high-precision digital image, and a low-precision digital image. In each of these cases, the images being differenced have identical color gamuts and color spaces. As a result, none of these prior art configurations would support the storage of extended color gamut information as required in the present invention.

Each of the aspects of the invention shown in FIG. 2 will now be discussed in more detail. The extended color gamut digital images 21 produced by opto-electronic image digitization device(s) 20 can take many different forms. For example, one opto-electronic image digitization device 20 can produce extended color gamut digital images 21 from scans of photographic negatives, another from scans of photographic transparencies, or another from scans of photographic prints. Further, the opto-electronic digitization device 20 can be a digital camera, producing extended color gamut digital images from original scenes. Depending on the source of the images, as well as any image processing that has been applied to the images, the images can have very different color gamuts and color representations.

Extended color gamut digital images 21 from scanned photographic negatives and digital cameras can contain information representative of the colors of original scenes having a much larger luminance dynamic range than can be encoded in many storage color spaces. In this case, luminance dynamic range is simply one aspect of color gamut related to the range of luminance values that can be represented. On the other hand, extended color gamut digital images 21 from photographic negatives, photographic transparencies, or from photographic prints may represent the colors of each of the image source photographic media In some cases it can be preferable to represent the extended color gamut digital images 21 from a variety of image sources as adjusted color values suitable for an extended color gamut display device, such as a hypothetical display device having an idealized color gamut. This approach can provide a common representation from a variety of image sources, within certain systems.

The color gamut of an imaging system is the range of colors that the system can represent or produce. The color gamut available at any point within a particular imaging system is often the result of combined effects from an imaging medium and an opto-electrical imaging component. Since color is fundamentally a three-dimensional phenomenon, color gamuts can be viewed as a three-dimensional volume. Color values that are within the volume are said to be "in-gamut," whereas colors that are outside the volume are said to be "out-of gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta and yellow).

The image source processed through each opto-electronic image digitization device 20 determines the initial extent of the color gamut of each image. The color gamut of an image digitization operation is determined both by the digitization component and by any image source media. If the images were canned photographic prints, the initial color gamut of the images would generally be the color gamut of the original photographic print medium. Likewise if the images were captured by a digital camera, the initial color gamut of the images would generally be that of original scenes, although it may be limited by the dynamic range of the camera sensor and by lens flare. The color space that the images are later represented in is somewhat independent of the color gamut of the initial digitized images. For example, the color values for a scanned photographic print can be represented as raw scanner code values, or they can be given by device independent color values according to a color space such as the CIELB color space. Alternatively, the color values can be expressed in some other color space.

For many systems, it is convenient to store, display and manipulate the digital images in a particular storage color space that is well-suited for the work flow associated with that system. Frequently, the storage color space that is chosen will be a device dependent color space associated with a standard display device or medium used by the system. In many cases, video RGB color spaces are used because they can be displayed or previewed directly on a computer video display without any further processing.

Figure 1:
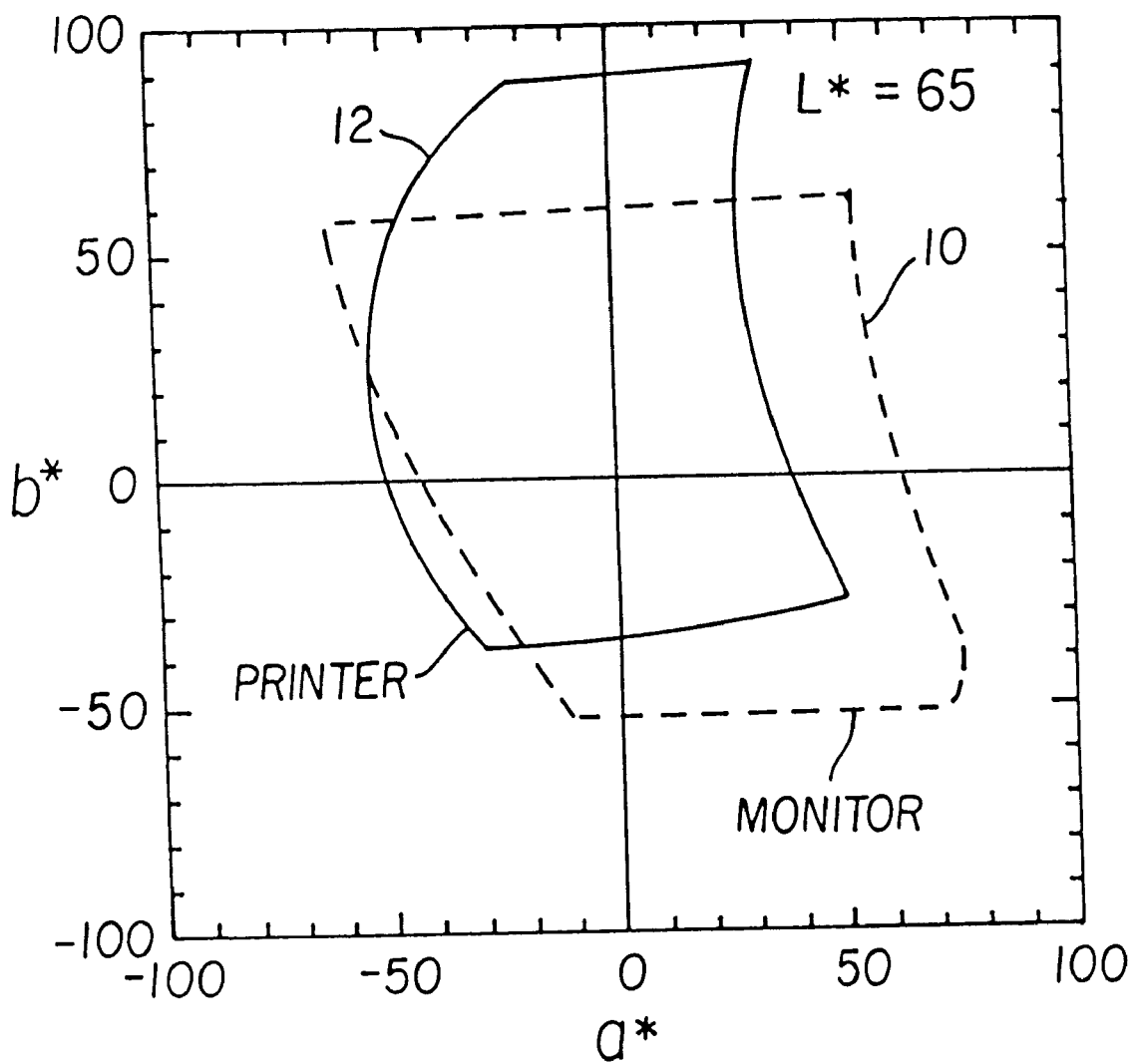
FIG. 1 is graph comparing the color gamuts of a typical video display, and a typical reflection print.

Additionally, many software applications that are available to manipulate images on a computer are designed to work with images in a video RGB color space. In other cases, particular limited gamut storage spaces may be chosen based on other system constraints. The color gamut of the storage color space will often be smaller than, or at least different than, the initial color gamut of the extended color gamut digital images 21. As a result, there generally will be colors in the extended color gamut digital images 21 that can not be represented in the storage color space. For example, consider the case where the extended color gamut digital images 21 are scanned photographic prints. There are many colors within the color gamut of a reflection print that are outside the color gamut of the video RGB color space. This can clearly be seen in FIG. 1 which shows cross-sections through a typical Video RGB Color Gamut 10, and a typical Reflection Print Color Gamut 12.

Therefore, information must be discarded in order to store the reflection print color values in a video RGB color space, or in any other limited color gamut storage space. It is characteristic of limited color gamuts that the particular limitations required for one, such as a video RGB display gamut, do not match the required limitations for other limited color gamuts. In prior art arrangements, the image information that is discarded in mapping an image to one limited color gamut is lost permanently and can not be recovered. In the present invention, the information that is discarded will be stored in one or more residual image(s).

The image processing unit 22 operates on each extended color gamut digital image 21 to adjust the color values of the extended color gamut digital image 21 to fit within the limited color gamut of the storage space, forming each limited color gamut digital image 26. In this operation, information must be discarded when color values that are outside the limited color gamut are mapped to color values within the limited color gamut. In some cases, the color values for the out-of-gamut colors are simply "clipped," i.e., they are mapped to color values the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the images.

In many cases, the extended color gamut will contain color values that have higher chroma values than can be represented in the limited color gamut. In some cases, the extended color gamut can also have a larger luminance dynamic range than can be represented in the limited color gamut. In the case where it is necessary to reduce the luminance dynamic range of the images, one part in adjusting the color values of the extended color gamut digital images 21 is typically the application of a tone scale function. The tone scale function might be applied to a luminance channel of the images, or alternatively to each color channel of RGB color representations. In some applications, the images being processed can actually be a monochrome images, e.g., a black-and-white images. In this case, the tonescale function would be applied to the image luminance values.

For cases where the extended color gamut digital images 21 are representations of the colors in original scenes, adjusting the color values can involve determining reproduced color values that will produce desired aim colors on a target display device. For example, optimal color reproduction aims can be applied to determine desired video RGB aim colors for the original scene colors. Alternatively, optimal color reproduction aims determined for a standard display device can be used in adjusting the color values of the extended color gamut digital images 21, producing limited color gamut digital images 26 suitable for display on a set of similar display devices. The process of transforming the original scene color values into aim reproduced color values is sometimes referred to as "rendering" the image.

Once the limited color gamut digital images 26 are determined, the image processing unit then represents each limited color gamut digital image 26 in the storage color space. This operation typically involves applying a device model, or a color space conversion, to determine the storage space color values that correspond to the adjusted color values of the limited color gamut digital images 26. For example, if the adjusted color values are specified in terms of the CIELAB color space, a video display device model can be used to determine the corresponding video RGB values that would be necessary to produce the specified adjusted color values.

Next, the image processing unit 22 determines one or more residual image(s) 27, associated with each limited color gamut digital image 26. The residual image(s) 27 represent the difference between each extended color gamut digital image 21 and its corresponding limited color gamut digital image 26. In its simplest form, each residual image 27 can be calculated by simply subtracting the adjusted color values of each limited color gamut digital image 26 from the input color values of its corresponding extended color gamut digital image 21. The residual image(s) 27 would then be in terms of the color space used to represent those color values. Alternatively, the limited color gamut digital images 26 and extended color gamut digital images 21 can be transformed into some other space that would be useful for computing the residual images 27. For example, it might be desirable to compute the residual images 27 in a color space that is well-suited for compressing the residual images 27 or that is convenient for use in reconstructing the extended color gamut digital images 21. Generally, the extended color gamut digital images 21 and the limited color gamut digital images 26 should be represented in the same color space before the residual images 27 are calculated so that the in-gamut colors will be given by zero residual errors. Since most images will only have a small fraction of color values that are out of gamut, the residual images 27 will be dominated by zeros, and therefore will be highly compressible.

For cases where the operation of determining the limited color gamut digital images 26 involves the application of a transform that modifies the color values for the colors within the limited color gamut as well as those outside the limited color gamut, residual images 27 determined by directly computing the difference between the input color values of the extended color gamut digital images 21 and the adjusted color values of the limited color gamut digital images 26 would have a large number of non-zero values. This can be undesirable for cases where the residual images 27 are to be compressed. The prior example where the extended color gamut digital images 21 are representations of original scenes, and the determination of the limited color gamut digital images 26 includes rendering the color values to determine desirable color values for a target display device, will generally suffer from this problem. In this case, it can be desirable to apply a second rendering function to the extended color gamut digital images 21 to determine a second set of rendered color values that are desirable for another display device having a larger color gamut than the first target display device. If the second rendering function were identical to the first rendering function throughout most of the color gamut, then residual images 27 computed by taking the difference between the first and second rendered images would again be largely dominated by zero differences. In one embodiment of the present invention, the first rendering function performed by the image processing unit 22 produces rendered images optimized for a video display, and the second rendering function performed by the image processing unit 22 produces rendered images optimized for some hypothetical display device having an idealized large color gamut.

In another embodiment the image processing unit 22 computes the residual images 27 relative to the storage color space color values. Therefore, the original extended color space digital images 21 must be transformed to the storage color space in addition to the limited color gamut digital images 26. The complication is that the storage color space will typically only have a limited color gamut. For example, if the storage color space is a video RGB color space, then the color gamut of the storage space would be limited to the color gamut of the video display. Therefore, to represent the original extended color gamut digital images 21 in the storage color space, it is necessary to define an extended version of the storage color space that does not impose the limited color gamut. For example, 24-bit video RGB color spaces usually encode the color values in terms of integer code values in the range of 0 to 255. In order to allow the encoding of colors outside the color gamut of the video display, the original extended color gamut digital images 21 can be represented in an extended storage space where the code values were allowed to go outside the range 0 to 255. This permits the encoding of colors with higher chroma values, as well as larger luminance dynamic range values, than could be encoded directly in the storage color space. After both the limited color gamut digital images 26 and the extended color gamut digital images 21 have been represented in terms of the storage color space, the residual images 27 are then calculated as before by computing a difference between each corresponding two images. This embodiment results in residual image(s) 27, each representing a difference between an extended color gamut digital image 21 represented in an extended storage color space and its corresponding limited color gamut digital image 26 represented in the corresponding limited color gamut storage color space.

In a third embodiment of the present invention, the image processing unit 22 compresses each limited color gamut digital image 26 to form a compressed limited color gamut digital image. The compression operation may be performed using any one of many image data compression methods such as the well-known JPEG compression method, which is based on a discrete cosine transform. There are many other types of image data compression methods known to those skilled in the art including those based on differential pulse code modulation, vector quantization, wavelets, or fractals. In some cases, the image data compression algorithms are lossless, meaning that an exact copy of the original image can be reconstructed from the compressed image. However, in many cases, the image data compression algorithms are lossy meaning that an image reconstructed from the compressed image will only be an approximation of the original image. In these cases, the use of image data compression will introduce errors into the limited color gamut digital images 26.

The operation of computing the residual images 27 in this embodiment of the present invention is slightly modified relative to the previous embodiments. Rather than computing the residual image(s) 27 based on an original limited color gamut digital image 26, the residual image(s) 27 are computed from an uncompressed version of a compressed limited color gamut digital image. In this way, the residual image(s) 27 not only include the differences introduced by representing the image in the limited color gamut, but also account for losses introduced in the image data compression process. In particular the image processing unit 22 computes the residual image(s) 27 to represent the difference between an extended color gamut digital image 21 represented in an extended storage color space and an uncompressed version of its corresponding compressed limited color gamut digital image 26.

There are several reasons why it can be advantageous to store multiple residual images instead of just a single residual image. For example, it might be desirable to store residual errors associated with luminance errors in one residual image, and residual errors associated with chrominance errors in additional residual images. This can enable an application to make a choice about which types of residual errors it would use during the process of determining a reconstructed extended color gamut digital image.

In another case, multiple residual images can correspond to different subsets of extended dynamic range image data. For example, a first residual image can extend the dynamic range of the digital image some fixed amount beyond the dynamic range associated with the limited color gamut digital image. A second residual image can then extend the dynamic range an additional increment beyond the extended dynamic range associated with the first residual image. In this way, an application using the extended color gamut digital images can use only the residual images associated with the amount of extended dynamic range required by the application.

Another reason that using multiple residual images is useful is for cases where the residual images are stored in tags in digital image files having a limited size. In this case, the residual image data can be broken into smaller pieces that would fit within the size limitations. For example, residual images can be determined for subsets of pixels in the extended color gamut digital image. In this way, the residual image data can be stored in a tiled fashion.

Once the residual images 27 are calculated, each should be associated in some fashion with its limited color gamut digital image 26 represented in the storage color space. This can involve storing the residual image(s) 27 in a memory buffer that is associated with a second memory buffer used to store the limited color gamut digital image 26 represented in the storage color space. Alternatively, the image processing unit 22 can store the limited color gamut digital images and their associated residual images 27 in one or more digital image files 23 on some sort of transportable digital storage media 25 such as a magnetic disk, an optical disk, or a PCMCIA card by means of the digital file output unit 24. In this case, each limited color gamut digital image 26 and its associated residual image(s) 27 could be stored in two different associated files, or could be stored in the same digital image file 23. In many cases, the file format used to store the digital image files 23 may support the use of private image tags. For example, the file formats TIFF, EXIF and FlashPIX all support tags of this sort. These tags are sometimes referred to as meta-data. In cases where file formats of this type are used, it will be convenient to store the residual image data in the form of a residual image tag.

In this way, applications that do not know how to make use of the residual image tag will simply ignore it, and will therefore have access only to the limited color gamut digital images 26 represented in the storage color space. Whereas applications that know how to use the residual image tag will be able to make use of it to reconstruct the originating extended color gamut digital images 21 used to create the limited color gamut digital images 26 and their associated residual images 27. Some file formats place a limit on the size of tags, so the image processing unit 22 will compress the residual images 27 for use with these file formats. Compressing the residual images 27 can be accomplished using many different types of image data compression methods. In some cases, it will be desirable to compress the residual image using a lossless image data compression method, whereas in other cases, it will be acceptable to use a so-called lossy image data compression method.

Figure 3:
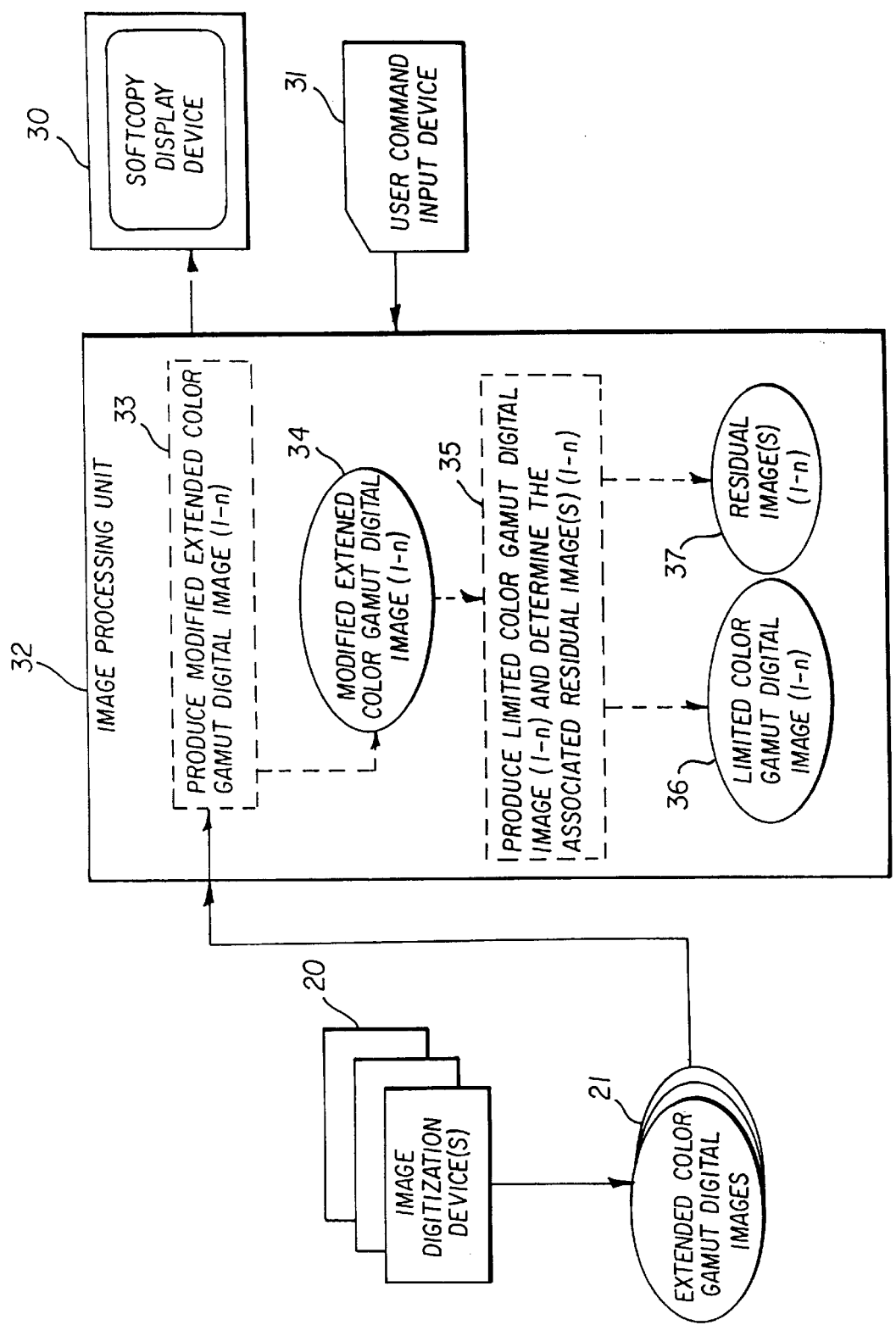
FIG. 3 is a diagram showing a second imaging system including components enabling a person to interact with the process for making limited gamut digital images associated with residuar images in accordance with the present invention.

Another embodiment of the present invention is shown in FIG. 3. This embodiment is similar to that shown in FIG. 2 but differs in the way that the image processing unit 32 operates on the extended color gamut digital images 21. An image processing unit 32 in this embodiment performs a produce modified extended images task 33 to produce (1–n) modified extended color gamut digital images 34 and then performs a produce images task 35 to produce (1–n) limited color gamut digital images 36 with (1–n) associated residual images 37. As discussed with reference to the imaging system shown in FIG. 2, this imaging system has opto-electronic image digitization device(s) 20 that digitize still photographic images and produce extended color gamut digital images 21. The image processing unit 32 receives the extended color gamut digital images 21 from the opto-electronic image digitization device(s) 20. The image processing unit 32 operates on each extended color gamut digital image 21 as it is available to produce at least one corresponding modified extended color gamut digital image 34. Then the image processing unit 32 operates on each modified extended color gamut digital image 34 as it is available to produce a corresponding limited color gamut digital image 36 by adjusting the color values of each modified extended color gamut digital image 34 to fit within a limited color gamut. Next, as each limited color gamut digital image 36 is available, the image processing unit 32 represents each limited color gamut image 36 in a storage color space. Then the image processing unit 32 determines one or more residual image(s) 37, associated with each limited color gamut digital image 36, and representing the difference between each limited color gamut digital image 36 and its corresponding modified extended color gamut digital image 34. The limited color gamut digital images 36 in the storage color space and their associated residual images 37 are associated such that they are adapted to be used to reconstruct modified extended color gamut digital images 34. Further, the image processing unit 32 is shown coupled to a softcopy display device 30 and a user command input device 31, provided as a means of interacting with a person operating the imaging system.

Since most of the operations in this embodiment of the invention are identical to the corresponding operations in the previous embodiments, only the operations that differ will be discussed in more detail. The primary distinction with this embodiment is that the extended color gamut digital images 21 received by the image processing unit 32 from the opto-electrical digitization device(s) 20 are not used directly to create the limited color gamut digital images 36. Instead, the image processing unit 32 adjusts the extended color gamut digital images 21 to form modified extended color gamut digital images 34, representing preferred images for further use in the imaging system.

In some cases, the modifications to the extended color gamut digital images 21 can be determined by applying an automatic algorithm. One example of this type of modification is an exposure correction operation. An exposure correction operation can be used, first, to determine an image modification necessary to correct an image for over exposure, under exposure, or extremes in original exposure illumination, and second, to apply the determined modification, producing a modified extended color gamut digital image 34.

Alternatively, the modifications to the extended color gamut digital images 21 can be interactively determined by a person operating the imaging system. For example, the image processing unit 32 can display, through the softcopy display device 30, an appropriate representation of each extended color gamut digital image 21. Then, through the user command input device 31, the image processing unit 32 can enable the person operating the imaging system to specify a particular region of interest to be used in cropping in each original extended color gamut digital image 21 to obtain each corresponding modified extended color gamut digital image 34.

As was the case with the extended color gamut digital images 21 in the previous embodiments, the modified extended color gamut digital images 34 resulting from scans of photographic negatives, or resulting from images produced in digital cameras can contain information representative of the colors of original scenes having a much larger luminance dynamic range than can be encoded in many storage color spaces. On the other hand, modified extended color gamut digital images 34 from photographic negatives, photographic transparencies, or from photographic prints may represent in turn the colors of each of these image source photographic media. In some cases it can be preferable to represent the modified extended color gamut digital images 34 from a variety of image sources as adjusted color values suitable for an extended color gamut display device, such as a hypothetical display device having an idealized color gamut. This approach can provide a common representation from a variety of image sources, within certain systems.

Once the modified extended color gamut digital images 34 have been determined, the determination of the limited color gamut digital image 36 corresponding to each modified extended color gamut digital image 34, and then the computation of one or more residual image(s) 37 associated with each of those limited color gamut digital images 36 is performed by the image processing unit 32 in the same fashion described in the previous embodiments, with the exception that the modified extended color gamut digital images 34 are used in place of the extended color gamut digital images 21. As in the previous embodiments, once the residual image(s) 37 have been calculated, each is associated in some fashion with its limited color gamut digital image 36 represented in the storage color space such that they are adapted to be used to reconstruct modified extended color gamut digital images 34.

The result of applying the imaging systems of the present invention shown in FIG. 2 and FIG. 3 is the creation of both limited color gamut digital images in a storage color space and associated residual images which correlate the limited color gamut digital images to extended color gamut digital images. As discussed previously, the limited color gamut digital images are generally well suited for display on a target display device such as a video display. One advantage of this approach is that systems that cannot make use of the residual images will be able to display and manipulate the limited color gamut digital images directly with no image quality or computation disadvantage relative to the prior art where only the limited color gamut digital image is stored. However, the information that normally would have been discarded has now been stored in the residual images and is available for use by imaging systems that can utilize it. In these systems, the limited color gamut digital images are extracted with the residual images from the digital image files, and can be used to reconstruct the originating extended color gamut digital images. As discussed previously, in some cases the limited color gamut digital images and their associated residual images can be used to construct other related extended color gamut images as well. The reconstruction and use of the extended color gamut digital images will be the same whether the limited color gamut digital images and associated residual images were formed originally from extended color gamut digital images or were formed originally from modified extended color gamut digital images.

Figure 4:
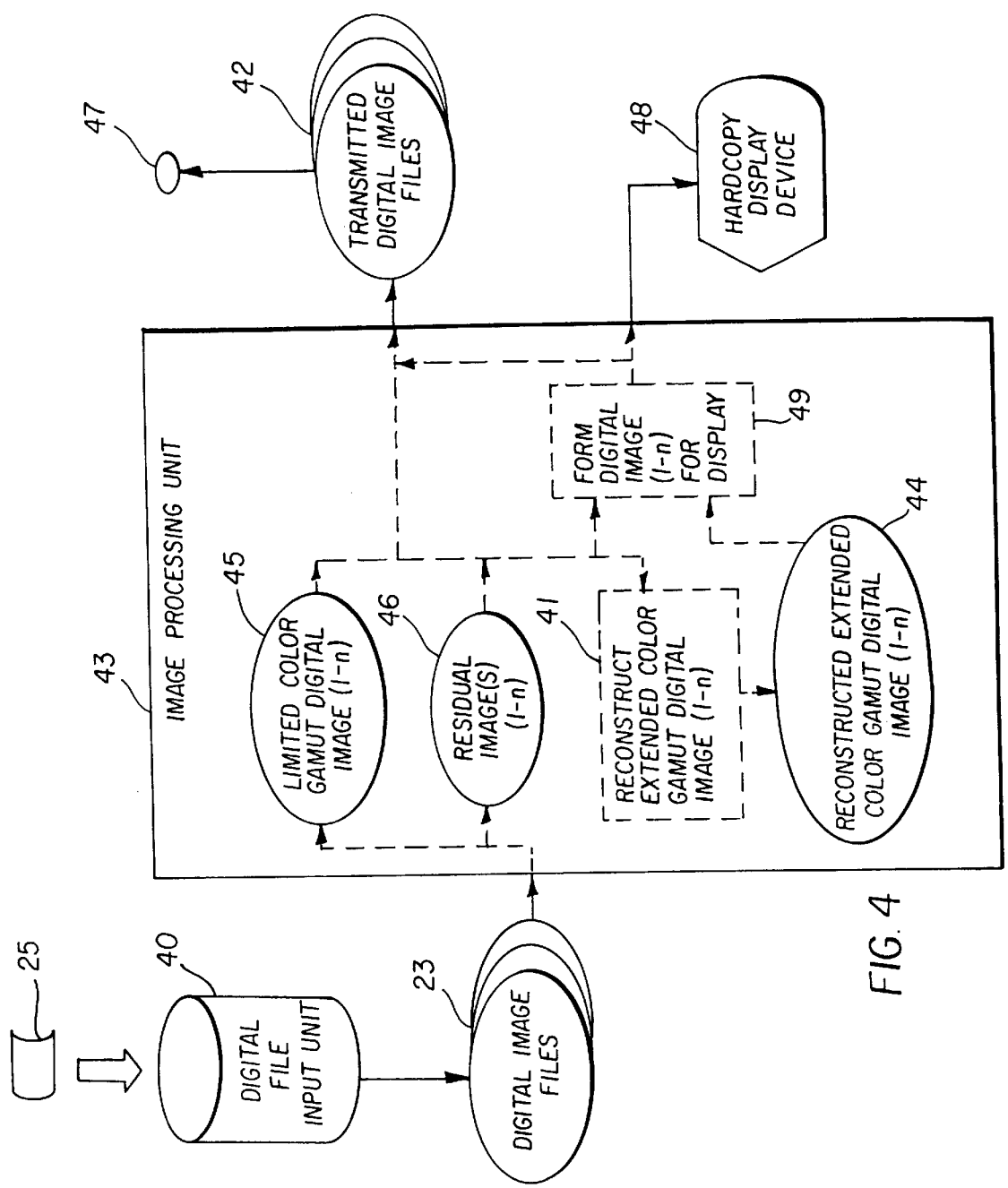
FIG. 4 is an imaging system diagram showing one possible configuration of system components involved in the use of the digital image files created in accordance with the present invention.

FIG. 4 shows an embodiment of an imaging system that uses limited color gamut digital image(s) with their associated residual image(s) to form digital image(s) appropriate for display on a particular display device. The input to this system is one or more digital image file(s) 23, stored on a transportable digital storage medium 25, and containing limited color gamut digital image(s) 45 in a storage color space with their associated residual image(s) 46 created as described above. A digital file input unit 40 reads the digital image file(s) 23 and delivers them to an image processing unit 43. The image processing unit 43 performs a form display images task 49 by accepting each of the digital image file(s) 23 and then processing the limited color gamut digital image(s) 45 and their associated residual image(s) 46 to derive (1-n) digital image(s) appropriate for display on a particular display device, such as the hardcopy display device 48 shown. The hardcopy display device 48 accepts each display-processed digital image from the image processing unit 43 and produces corresponding hardcopy photographic prints. The hardcopy display device can be one of a variety of printing devices such as a laser writer, a thermal dye-diffusion printer, or an inkjet printer.

In addition to the creation of hardcopy prints, such an imaging processing unit 43 can function to transmit either the input digital image file(s) 23, or digital image file(s) created from the display-processed digital image(s) in accordance with this invention, electronically through a digital communications connection 47 such as an internet connection or a local area network. The image processing unit 43 can deliver the transmitted digital image file(s) 42 over the digital communications connection 47 for use at a particular remote digital imaging site, or can make the transmitted digital image file(s) 42 available for general access over a connection such as the world-wide web.

The image processing unit 43 can also use the limited color gamut digital image(s) 45 with their associated residual image(s) 46 in performing a reconstruct extended images task 41 to form (1-n) reconstructed extended color gamut image(s) 44. Typically forming the reconstructed extended color gamut digital image(s) 44 will involve combining the limited color gamut digital image(s) 45 and their associated residual image(s) 46.

The reconstructed extended color gamut digital image(s) 44 can be used to form the digital image(s) appropriate for display on the hardcopy display device 48. Use of the reconstructed extended color gamut digital images 44 to form the digital images for display on the hardcopy display device 48 is particularly appropriate in the situation where the hardcopy display device 48 has a color gamut different from the limited color gamut of the limited color gamut digital images 45 in the digital image files 23. This enables the generation of optimal prints from the extended color gamut digital images, rather than prints limited by constraints of the storage color space. For example, in the case where the reconstructed extended color gamut digital images 44 are representative of the colors of original scenes, adjusting the color values to form the digital images appropriate for display on the hardcopy display device 48 can involve rendering the reconstructed extended color gamut digital images 44 to determine the desired aim reproduced colors for the target hardcopy display device 48. On the other hand, a different color adjustment function can be required to create the display-processed images for the hardcopy display device 48 in the situation where the reconstructed extended color gamut digital images 44 are representative of the colors of a photographic medium. This might be the case if the original image sources were scanned photographic negatives, photographic transparencies, or photographic prints. In some cases, reconstructed extended color gamut digital images 44 from a variety of image sources can have a common representation as adjusted color values suitable for an extended color gamut display device, such as a hypothetical display device having an idealized color gamut. In this situation the image processing unit 43 can apply a common color adjustment function to each of these reconstructed extended color gamut digital image(s) 44 to constrain the color gamut of the extended color gamut display device to the real color gamut of the target hardcopy display device 48.

Figure 5:
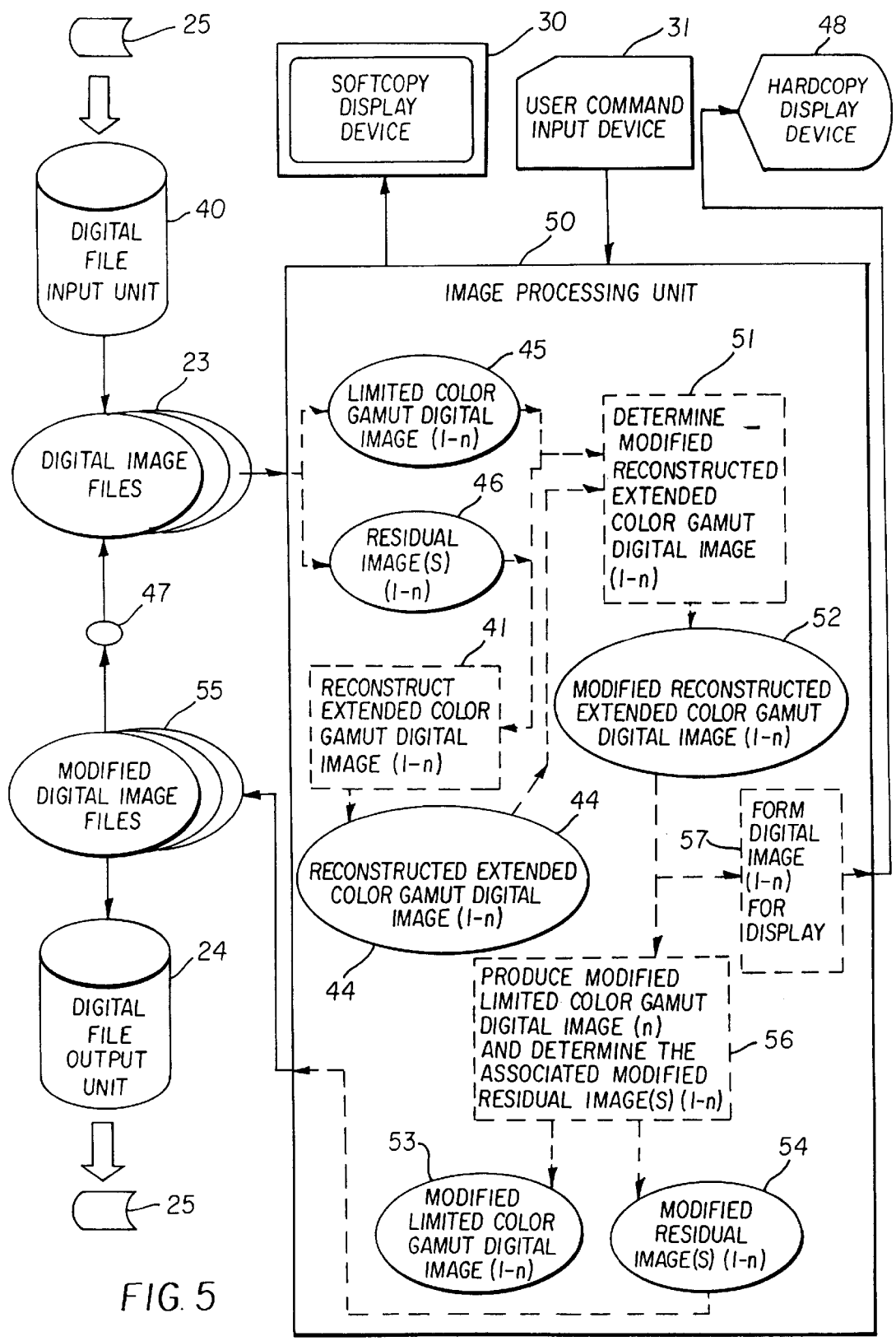
FIG. 5 is a diagram showing a second configuration of system components involved in the use of the digital image files created in accordance with the present invention.

FIG. 5 shows a preferred embodiment of an imaging system that uses limited color gamut digital image(s) 45 with associated residual image(s) 46. The input to this system is one or more digital image file(s) 23, stored on a transportable digital storage medium 25, or received from a digital communications connection 47. Said digital image files 23 containing limited color gamut digital image(s) 45 in a storage color space with their associated residual image(s) 46 created as described above. As shown in FIG. 5, a digital file input unit 40 reads digital image file(s) 23 and delivers them to an image processing unit 50. The image processing unit 50 performs a determine modified extended images task 51 by accepting each of the digital image file(s) 23 and then processing the (1-n) limited color gamut digital image(s) 45 and their (1-n) associated residual image(s) 46 to determine and apply desired modification(s), thereby determining (1-n) modified reconstructed extended color gamut digital image(s) 52. The image processing unit 50 is shown coupled to a softcopy display device 30 and a user command input device 31, so that image modifications can be determined through interaction with the person operating the imaging system.

In the process of determining the desired modification(s) from the input limited color gamut digital images 45 and their associated residual image(s) 46 the images processing unit 50 can perform a reconstruct extended images task 41 by forming (1-n) reconstructed extended color gamut digital image(s) 44. For a given type of modification, the use of the reconstructed extended color gamut digital image(s) 44 can be preferred in determining the modification. For example, consider the case where an input limited color gamut digital image 45 is determined to be over-exposed. In this case, the highlights of the limited color gamut digital image 45 would have been clipped when it was derived from its originating extended color gamut digital image. However, that highlight information, retained in the associated residual image(s) 46, can be restored in the reconstructed extended color gamut digital image 44. This highlight information can then be used to determine an exposure-corrected (i.e., modified) reconstructed extended color gamut digital image 52, and thereby a modified limited color gamut digital image 53 that retains the highlight detail. Modification(s) to the digital image(s) can be interactively specified by a person operating the digital imaging system, such as in the case of an adjustable lightness knob provided with preview limited color gamut digital image(s) on the softcopy display device 30. In the case where the storage color space is a video RGB color space the input limited color gamut digital image(s) 45 would be suitable for preview display as they are received. The person operating the imaging system might then provide the desired level of correction through the user command input device 31. Modification(s) can also be determined by applying an automatic algorithm to the digital image. For example, a "scene balance algorithm" can be used to estimate the best color balance and exposure correction level for an image.

The image processing unit 50 can also use the resulting modified reconstructed extended color gamut digital image (s) 52 to perform a form modified display images task 57 by forming (1–n) image(s) appropriate for display on a particular hardcopy display device 48. As discussed previously, use of the modified reconstructed extended color gamut digital image(s) 52, rather than limited color gamut digital image(s), to form the digital image(s) for display on the hardcopy display device 48 is particularly appropriate in the situation where the hardcopy display device 48 has a color gamut different from the limited color gamut of the input limited color gamut digital image(s) 23. This enables the generation of optimal prints from the modified extended color gamut digital image(s), rather than prints limited by constraints of the storage color space. The hardcopy display device 48 accepts each display-processed image from the image processing unit 50 and produces corresponding hardcopy photographic prints.

In some cases, it will be desirable to send the modified digital image(s) directly to a display device, but in other cases it can be desirable to write the modified digital image(s) back out to modified digital image file(s) 55. When required, the image processing unit 50 can perform a produce modified images task 56 to determine (1–) modified limited color gamut digital image(s) 53 and (1–n) associated modified residual image(s) 54, thereby encoding the modified reconstructed extended color gamut digital image(s) 52, using the methods described by this invention. Further, the image processing unit 50 can then operate on each modified limited color gamut digital image 53 with its associated modified residual image(s) 54 to create corresponding modified digital image file(s) 55, stored internally using a digital storage medium. Each modified digital image file 55 can then be delivered to a digital file output unit 24 which stores each digital image file 55 on a transportable digital storage medium 25.

The imaging processing unit 50 can also function to transmit either the original digital image file(s) 23, the modified digital image file(s) 55, or the display-processed digital image file(s), electronically through a digital communications connection 47 such as an internet connection or a local area network. The image processing unit can deliver the transmitted digital image file(s) over the digital communications connection 47 for use at a particular remote digital imaging site, or can make the transmitted digital image file(s) available for general access over a connection such as the world-wide web.

This invention has been described in detail with particular reference to certain preferred embodiments thereof, but it will be understood that variations and modifications can be effected within the spirit and scope of the invention. For example, the imaging system operations shown in FIG. 2 can be combined in a single imaging system with the operations referenced with respect to any of the other imaging system embodiments described.

PARTS LIST 10 video RGB color gamut
12 reflection print color gamut
20 image digitization devices
21 extended color gamut digital images
22 image processing unit
23 digital image files
24 digital file output unit
25 transportable digital storage medium
26 limited color gamut digital images
27 residual images
28 produce images task
30 softcopy display device
31 user command input device
32 image processing unit
33 produce modified extended images task
34 modified extended color gamut digital images
35 produce images task
36 limited color gamut digital images
37 residual images
40 digital file input unit
41 reconstruct extended images task
42 transmitted digital image files
43 image processing unit
44 reconstructed extended color gamut digital images
45 limited color gamut digital images
46 residual image(s)
47 digital communications connection
48 hardcopy display device
49 form display images task PARTS LIST (con't)

50 image processing unit
51 determine modified extended images task
52 modified reconstructed extended color gamut digital images
53 modified limited color gamut digital images
54 modified residual images
55 modified digital image files
56 produce modified images task
57 form modified display images task

What is claimed is:

1. A digital image processing system comprising:
 a) one or more opto-electronic image digitization device (s) which digitize still photographic images and produce an extended color gamut digital image corresponding to each still photographic image; and
 b) an image processing unit, coupled with said image digitization device(s), which is operative to receive a plurality of extended color gamut digital images from said image digitization device(s) and including means for:
  i) producing at least one limited color gamut digital image from each said extended color gamut digital image by adjusting the color values of the extended color gamut digital image to fit within a limited color gamut;

ii) representing each said limited color gamut digital image in a storage color space;

iii) determining a difference between one said extended color gamut digital image and its corresponding limited color gamut digital image forniing one or more residual image(s); and iv) storing each limited color gamut digital image in the storage color space with its residual image(s) such that the associated residual images and the limited color gamut digital images in the storage color space are adapted to be used to reconstruct extended color gamut digital images.

2. The system according to claim 1 where at least one of the opto-electronic image digitization devices produces extended color gamut digital images from scans of photographic negatives.

3. The system according to claim 1 where at least one of the opto-electronic image digitization devices produces extended color gamut digital images from scans of photographic transparencies.

4. The system according to claim 1 where at least one of the opto-electronic image digitization devices produces extended color gamut digital images from scans of photographic prints.

5. The system according to claim 1 where at least one of the opto-electronic image digitization devices is a digital camera producing extended color gamut digital images from original scenes.

6. The system according to claim 1 where the extended color gamut digital images are representative of the colors of original scenes.

7. The system according to claim 1 where the extended color gamut digital images are representative of the colors of a photographic medium.

8. The system according to claim 1 where the extended color gamut digital images are represented as adjusted color values that are desirable for an extended color gamut display device.

9. The system according to claim 8 where the extended color gamut display device is a hypothetical display device having an idealized color gamut.

10. The system according to claim 1 where the limited color gamut digital images are determined by clipping colors that are outside the limited color gamut so that they are on the surface of the limited color gamut.

11. The system according to claim 1 where the limited color gamut digital images are determined by using gamut mapping that preserves color appearance.

12. The system according to claim 1 where the limited color gamut digital images are determined by modifying color values that are outside the limited color gamut so that they are mapped to color values within the limited color gamut.

13. The system according to claim 1 where the extended color gamut digital images have a larger range of chroma values than the limited color gamut digital images.

14. The system according to claim 1 where the extended color gamut digital images have a larger luminance dynamic range than the limited color gamut digital images.

15. The system according to claim 14 wherein the means for adjusting the color values of each extended color gamut digital image to determine a corresponding limited color gamut digital image includes applying a tone scale function to reduce the luminance dynamic range of the image.

16. The system according to claim 14 where the extended luminance dynamic range digital images are monochrome digital images.

17. The system according to claim 1 including a particular display device and wherein each limited color gamut digital image is determined by adjusting the colors of an extended color gamut digital image to produce adjusted color values that are desirable for the particular display device.

18. The system according to claim 1 where each residual image is determined by computing a difference between each extended color gamut digital image represented in an extended storage color space and its corresponding limited color gamut digital image represented in the storage color space.

19. The system according to claim 1 wherein said image processing unit is operative to compress the limited color gamut digital images in the storage color space using an image data compression technique.

20. The system according to claim 19 where each residual image is determined by computing a difference between each extended color gamut digital image represented in an extended storage color space and an uncompressed limited color gamut digital image computed from its corresponding compressed limited color gamut digital image.

21. The system according to claim 1 where the storage color space is a particular device dependent color space.

22. The system according to claim 21 where the storage color space is a video RGB color space.

23. The system according to claim 1 wherein the storage color space is a particular limited color gamut color space.

24. The system according to claim 1 wherein the system uses a digital storage medium and said image processing unit includes means for producing digital image files, using the digital storage medium, containing limited color gamut digital images in the storage color space with their associated residual images.

25. The system according to claim 24 further including a digital file output unit, coupled to said image processing unit, which is operative to store the digital image files on a transportable digital storage medium.

26. The system according to claim 24 where the residual images are stored as additional data in the digital image files.

27. The system according to claim 24 where an image data compression technique is applied to the residual images before they are stored so that they each use a smaller amount of digital storage memory.

28. The system according to claim 24 where the limited color gamut digital images are stored in the digital image files, and the associated residual images are stored in separate associated digital image files.

29. The digital image processing system comprising:

a) one or more opto-electronic image digitization device (s) which digitize still photographic images and produce an extended color gamut digital image corresponding to each still photographic image; and b) an image processing unit, coupled with said image digitization device(s), which is operative to receive a plurality of extended color gamut digital images from said image digitization device(s) and including means for:

i) producing at least one modified extended color gamut digital image from said extended color gamut digital images;

ii) producing at least one limited color gamut digital image from each said modified extended color gamut digital image by adjusting the color values of the modified extended color gamut digital image to fit within a limited color gamut;

iii) representing each said limited color gamut digital image in a storage color space;

iv) determining a difference between one said modified extended color gamut digital image and its corresponding limited color gamut digital image forming one or more residual image(s); and v) storing each limited color gamut digital image in the storage color space with its residual image(s) such that the associated residual images and the limited color gamut digital images in the storage color space are adapted to be used to reconstruct extended color gamut digital images.

30. The system according to claim 29 further including a softcopy display device and user command input device, coupled to said image processing unit, for providing interactively user specified modification(s) to the extended color gamut digital image(s).

31. The system according to claim 29 wherein the modification(s) to the extended color gamut digital image(s) are determined by applying an automatic algorithm.

32. A digital image processing system for receiving information from a transportable digital storage medium and for producing an image for a particular display device, comprising:

a) a digital file input unit, coupled to read the contents of the transportable digital storage medium containing one or more digital image file(s) that have been stored thereon, said digital image file(s) containing limited color gamut digital image(s) in a storage color space with associated stored residual image(s) such that the associated residual image(s) and the limited color gamut digital image(s) are adapted to be used to reconstruct extended color gamut digital images with each of the residual image(s) comprising a difference between corresponding extended color gamut digital images and limited color gamut digital images; and b) an image processing unit, coupled to said digital file input unit, said image processing unit for accepting one or more of said digital image file(s) from said digital file input unit, and using the digital image(s) contained in said digital image file(s) to form digital image(s) appropriate for display on the particular display device.

33. The system according to claim 32 wherein the residual image(s) together with the limited color gamut digital image(s) in the storage color space are used to reconstruct extended color gamut digital image(s).

34. The system according to claim 33 wherein the reconstructed extended color gamut digital image(s) are used to form the digital image(s) appropriate for display on the particular display device.

35. The system according to claim 32 wherein the particular display device has a color gamut different than the limited color gamut.

36. The system according to claim 32 wherein said image processing unit is operative to digitally transmit at least one said digital image file through digital communications.

37. The system according to claim 32 further including at least one hardcopy display device operative to accept a plurality of digital images and to produce corresponding hardcopy photographic prints.

38. A digital image processing system comprising:

a) one or more digital file source(s), being individually or any combination of a digital file input unit, coupled to read the contents of a transportable digital storage medium containing one or more digital image file(s) that have been stored thereon, or a digital communications connection operative to receive one or more digital file(s), said digital image file(s) containing limited color gamut digital image(s) in a storage color space with associated stored residual image(s) such that the associated residual image(s) and the limited color gamut digital image(s) are adapted to be used to reconstruct extended color gamut digital image(s) with each of the residual image(s) comprising a difference between corresponding extended color gamut digital images and limited color gamut digital images; and b) an image processing unit, coupled to said digital file input unit, said image processing unit being operative to accept one or more of said digital image file(s) from said digital file input unit, and including means for:

i) specifying at least one desirable modification to one or more of the limited color gamut digital image(s) and associated residual image(s) contained in said digital image file(s); and ii) using each residual image together with its limited color gamut digital image in the storage color space, and its specified desirable modification(s), to determine each corresponding modified extended color gamut digital image.

39. The system according to claim 38 wherein the residual image(s) together with the limited color gamut digital image(s) in the storage color space are used to reconstruct extended color gamut digital image(s).

40. The system according to claim 39 wherein the desirable modification(s) are determined by using the reconstructed extended color gamut digital image(s).

41. The system according to claim 38 further including a softcopy display device, coupled with said image processing unit, and is operative to display a preview of digital image(s) by displaying the limited color gamut digital image(s) in the storage color space.

42. The system according to claim 41 further including a user command input device, coupled to said image processing unit and said softcopy display device, for providing interactively user specified desirable modification(s) to the limited color gamut digital image(s) and their associated residual image(s).

43. The system according to claim 38 wherein the desirable modification(s) to the limited color gamut digital image(s) and associated residual image(s) are determined by applying an automatic algorithm.

44. The system according to claim 38 wherein said image processing unit further includes means for:

i) producing at least one modified limited color gamut digital image from each said modified extended color gamut digital image by adjusting the color values of the modified extended color gamut digital image to fit within a limited color gamut;

ii) representing each said modified limited color gamut digital image in a storage color space;

iii) determining one or more modified residual image(s) each representing a difference between one said modified extended color gamut digital image and its corresponding modified limited color gamut digital image; and iv) associating each modified limited color gamut digital image in the storage color space with its modified residual image(s) such that the associated modified residual image(s) and the modified limited color gamut digital image(s) in the storage color space are adapted to be used to reconstruct extended color gamut digital image(s).

45. The system according to claim 44 wherein the system uses a digital storage medium and said image processing unit includes means for producing one or more modified digital image file(s), using the digital storage medium, containing modified limited color gamut digital image(s) in the storage color space with their associated modified residual image(s).

46. The system according to claim 44 further including a digital file output unit, coupled to said image processing unit, which is operative to store said modified digital image file(s) on a transportable digital storage medium.

47. The system according to claim 44 wherein said image processing unit also being operative to digitally transmit at least one said modified digital image file through digital communications.

48. The system according to claim 38 wherein said image processing unit is operative to use said modified extended color gamut digital image(s) to form digital image(s) appropriate for display on a particular display device.

49. The system according to claim 48 further including at least one hardcopy display device operative to accept a plurality of digital images and to produce corresponding hardcopy photographic prints.

* * * * *